United States Patent [19]

Ookuma et al.

[11] Patent Number: 5,108,596
[45] Date of Patent: Apr. 28, 1992

[54] BOROUS ION-EXCHANGED FINE CELLULOSE PARTICLES, METHOD FOR PRODUCTION THEREOF, AND AFFINITY CARRIER

[75] Inventors: Shigeru Ookuma, Hofu; Kouei Igarashi, Osaka; Masami Hara, Hofu; Kazuhiro Aso, Ibaraki; Hideo Yoshidome, Kishiwada; Hiroshi Nakayama, Hirakata; Keizo Suzuki; Kazuhiko Nakajima, both of Osaka, all of Japan

[73] Assignee: Kanebo Ltd., Tokyo, Japan

[21] Appl. No.: 445,667

[22] PCT Filed: Apr. 5, 1989

[86] PCT No.: PCT/JP89/00363

§ 371 Date: Dec. 4, 1989

§ 102(e) Date: Dec. 4, 1989

[87] PCT Pub. No.: WO89/09651

PCT Pub. Date: Oct. 19, 1989

[30] Foreign Application Priority Data

Apr. 5, 1988 [JP] Japan .................................. 63-82145
Apr. 8, 1988 [JP] Japan .................................. 63-85350
Mar. 13, 1989 [JP] Japan .................................. 1-57949

[51] Int. Cl.$^5$ .......................................... B01D 15/08
[52] U.S. Cl. ................................ 210/198.2; 210/502.1; 502/404; 536/30; 536/56; 536/57; 536/61
[58] Field of Search .................. 536/30, 56, 57, 61; 210/635, 656, 198.2, 502.1; 502/404

[56] References Cited

U.S. PATENT DOCUMENTS

| | | | |
|---|---|---|---|
| 4,137,399 | 1/1979 | Hulsmann | 536/58 |
| 4,336,070 | 6/1982 | Koshugi | 536/20 |
| 4,536,217 | 8/1985 | Loth | 536/87 |
| 4,619,970 | 10/1986 | Okamoto | 536/56 |
| 4,654,420 | 3/1987 | Furuyoshi | 536/59 |
| 4,656,261 | 4/1987 | Furuyoshi | 536/59 |
| 4,786,416 | 11/1988 | Yuki | 210/635 |
| 4,902,792 | 2/1990 | Okuma | 536/57 |
| 4,946,953 | 8/1990 | Okuma | 536/57 |
| 4,958,014 | 9/1990 | Shirokaze | 536/56 |
| 5,064,950 | 11/1991 | Okuma | 536/57 |

FOREIGN PATENT DOCUMENTS

| | | | |
|---|---|---|---|
| 48-9712 | 3/1973 | Japan | 210/198.2 |
| 62-2853 | 1/1987 | Japan | 210/198.2 |

OTHER PUBLICATIONS

Journal of the Chemical Society of Japan, 1981 (12), pp. 1890–1898, "Manufacture of Cellulosic, Spherical Ion–Exchange Bodies", Matsumoto et al.

Journal of the Chemical Society of Japan, 1981 (12), pp. 1883–1889, "Production of Spherical Cellulose Gel and Its Gel Chromatographic Performance", Motosato et al.

Primary Examiner—Ernest G. Therkorn
Attorney, Agent, or Firm—Flynn, Thiel, Boutell & Tanis

[57] ABSTRACT

This invention relates to ion-exchanged fine cellulose particles, porous fine cellulose particles which can be advantageously used as an affinity carrier, and methods of production thereof. These fine particles of the invention have the advantage that they possess excellent pressure-resistant strength and can treat treatment liquors under pressure at a high flowing velocity. Thus, they can be advantageously used industrially in various separation and purification processes.

32 Claims, 3 Drawing Sheets

POROUS ION-EXCHANGED FINE CELLULOSE PARTICLES, METHOD FOR PRODUCTION THEREOF, AND AFFINITY CARRIER

TECHNOLOGICAL FIELD

This invention relates to porous ion-exchanged fine cellulose particles, a method of production thereof, and to an affinity carrier.

BACKGROUND TECHNOLOGY

Particles of cellulose or its derivatives have recently come into use as a chromatographic material. Cellulose or its ion-exchanged products are used as a chromatographic filler. Particularly, a material obtained by introducing ion-exchange groups into a cellulose carrier has the excellent ability to separate proteins, and its utility is evaluated highly.

Intrinsically, a cellulose carrier used as a chromatographic filler is desirably one which is designed sufficiently with regard to the particle size distribution, and the amount and size of pores in the interior. As to the ion-exchanged product, too, it is very important, needless to say, to control not only the amount of ions exchanged but also the amount and size of pores.

Ion-exchanged products of cellulose have already been applied to the separation of proteins and enzymes in the field of biochemistry. Fibrous ion-exchanged cellulose products are widely marketed and generally used. The fibrous cellulose ion-exchanged cellulose products are irregularly shaped, and do not prove to be satisfactory in regard to the elevation of the column pressure when used as a chromatographic filler for filling in a column. To solve this problem, attempts have been made to render the shape of the ion-exchanged cellulose products spherical, and some methods for production thereof have been proposed.

Japanese Patent Publication No. 9712/1973 discloses a method of producing ion-exchanged cellulose particles which comprises dissolving cellulose substituted by ion-exchange groups in an alkaline solvent, emulsifying the solution into small droplets in a water-immiscible solvent, and contacting the emulsion with an acid reactive substance to precipitate the substituted cellulose in the form of spherical porous particles.

Japanese Patent Publication No. 2853/1987 discloses a method of producing particles of an ion-exchanged cellulose product which comprises introducing ion-exchanged groups into solid spherical particles of cellulose while maintaining their solid spherical shape, and then crosslinking the ion-exchanged solid spherical particles of cellulose.

Journal of the Japanese Chemical Society, No. 12, pages 1890-1897, 1981, gives a report entitled the production of spherical ion-exchanged cellulose.

Journal of the Japanese Chemical Society, No. 12, pages 1883-1889, 1981, gives a report entitled the production of spherical cellulose gels and their properties in gel chromatography.

The methods disclosed in the above paper and Japanese Patent Publication No. 2853/1987 involve steps of first producing solid spherical cellulose particles and then crosslinking the cellulose particles. These methods are characteristic in that the solid spherical particles of cellulose are produced by saponifying the granular particles of cellulose acetate, and the crosslinking reaction is carried out in an organic medium.

The affinity separating technique utilizing specific affinitive powder between biological substances has widely been used for the purpose of specifically adsorbing trace substances produced in a biological system and separate and purify them, or removing a specific component from a plasma preparation. Affinitive materials which do not non-specifically adsorb proteins and lipids other than those which are to be treated are suitable as an affinity carrier used for this purpose, and in the past, crosslinked particles of agarose, dextran, and polyacrylamide have been mainly utilized as such. However, since these crosslinked particles have low strength and are limited to use under low pressure conditions, they have the disadvantage of requiring long periods of time for separation. To overcome the disadvantage and perform separation and purification within short periods of time under high pressure conditions, agarose-type carriers having a high degree of crosslinking, polyvinyl alcohol-type carriers and cellulose-type carriers have been developed, but no carrier has yet been developed which is fully satisfactory with respect to all of the amount of ligands introduced, the strength of the carriers and the non-specific adsorption.

DISCLOSURE OF THE INVENTION

It is an object of this invention to provide a novel ion-exchanged product of cellulose consisting substantially of spherical to long spherical particles having a particle size of not more than 500 micrometers.

Another object of this invention is to provide a novel ion-exchanged product of cellulose having such pores and pore distribution as to exhibit excellent pressure resistance.

Another object of this invention is to provide an ion-exchanged product which exhibits a high pressure-resistant strength when filled in a column and can treat a treatment liquor under pressure at a high flowing velocity through the column, and has a high treating ability.

Another object of this invention is to provide a novel ion-exchanged product which even when repeatedly used, can continue to exhibit the excellent ion-exchanging ability while retaining a suitable porous structure for ion-exchange.

Another object of this invention is to provide a novel ion-exchanged product which can efficiently separate ionic compounds having a high fractionation index and therefore a high molecular weight, for example proteins.

Another object of this invention is to provide novel ion-exchanged crosslinked cellulose particles having the high ability to adsorb proteins such as bovine serum albumin.

Another object of this invention is to provide a novel affinity carrier.

Another object of this invention is to provide a novel affinity carrier having such pores and pore distribution as to exhibit excellent performance.

Another object of this invention is to provide an affinity carrier which exhibits a high pressure-resistant strength when filled in a column and can treat treatment liquors under pressure at a high flowing velocity through the column, and has a high treating ability.

Another object of this invention is to provide an affinity carrier into which ligands can be introduced in large amounts with low non-specific absorption.

Another object of this invention is to provide a novel process for producing the above ion-exchanged product of cellulose.

Other objects of this invention along with its advantages will become apparent from the following description.

According to this invention, the above objects and advantages are achieved firstly by ion-exchanged fine cellulose particles, characterized in that (a) they consist substantially of spherical or long spherical particles having a particle diameter in the wet state of not more than 500 micrometers, (b) they are composed of a crystalline cellulose phase and an amorphous cellulose phase, (c) they have an ion-exchange capacity of 0.1 to 3 meq/g, and (d) in the relation between the pore diameter and the pore volume of particles subjected to critical drying which is measured by a mercury porosimeter method, they have a maximum pore volume value within a pore diameter range of 0.006 to 1 micrometer, and the total volume of pores within the above range is at least 0.05 ml/g.

The ion-exchanged fine cellulose particles include those which are crosslinked, and those which are not.

The porous ion-exchanged cellulose particles are characterized by having the requisites (a) and (d). These requisites will be described below.

The fine ion-exchanged cellulose particles in accordance with this invention are composed substantially of spherical or long spherical particles. The term "long spherical" as used in the present specification is a concept which means that a projection or plan of a particle is, for example, elliptical, elongated circular, peanut-shaped or oval. The fine particles of ion-exchanged cellulose of this invention, as stated above, are spherical or long spherical, and therefore, differ from irregularly-shaped or angularly shaped particles.

Secondly, the fine particles of ion-exchanged cellulose of this invention are composed of a crystalline cellulose phase and an amorphous cellulose phase. The crosslinked fine particles of ion-exchanged cellulose have a crosslinkage between the cellulose molecular chains of the amorphous cellulose phase.

When the degree of crosslinkage between cellulose molecules existing in the amorphous cellulose phase is the bridging of hydroxyl groups of the cellulose molecules via molecules of a crosslinking agent.

When epichlorohydrin, for example, is used as the crosslinking agent, the degree of crosslinking can be specified by the absorbance of an absorption peak assigned to CH stretching vibration of alkylene in the infrared absorption spectrum of the crosslinked particles determined by the KBr tablet method. Preferably, they have an absorbance of 0.065 to 0.156 $mg^{-1} \cdot cm^{-2}$, especially preferably 0.094 to 0.140 $mg^{-1} \cdot cm^{-2}$.

Thirdly, the crosslinked fine particles of ion-exchanged cellulose of this invention have an ion-exchange capacity of 0.1 to 3 meq/g (c). The ion exchange capacity is preferably 0.3 to 2.5 meq/g, especially preferably 0.5 to 2.0 meq/g.

Fourthly, the crosslinked fine particles of ion-exchanged cellulose have such a requirement (d) that in the relation between the pore diameter and the pore volume of particles subjected to critical drying which is measured by a mercury porosimeter method, they have a maximum pore volume value within a pore diameter range of 0.006 to 1 micrometer, and the total volume of pores within the above range is at least 0.05 ml/g (d).

The critical drying is performed by a specific method to be described. Since according to the critical drying, the shape or distribution of pores of the particles obtained by the critical drying well reproduces that of the particles when they were wet, the critical drying is of much significance with regard to the fine particles of ion-exchanged cellulose of which pore volume and pore diameter in the wet state are considered as important.

In the fine particles of ion-exchanged cellulose in accordance with this invention, the total volume of pores within the above-mentioned size range is preferably 0.1 to 3 ml/g, especially preferably 0.12 to 2.5 ml/g.

The relation between the pore diameter and the pore volume of the fine particles of ion-exchanged cellulose of this invention is measured by the mercury porosimeter. By using the measured relation, the area of the inside surface of the pores can be calculated. In the fine particles of ion-exchanged cellulose, the inside surface so calculated is preferably 15 to 400 $m^2/g$, especially preferably 25 to 350 $m^2/g$.

The fine particles of ion-exchanged cellulose of this invention may have various ion-exchange groups which may be either cationic or anionic. Preferred cation exchange groups are, for example, those of the following formula

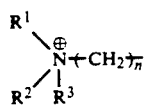

wherein $R^1$, $R^2$ and $R^3$, independently from each other, represent a hydrogen atom, an alkyl group having 1 or 2 carbon atoms, or a hydroxyalkyl group having 1 to 3 carbon atoms, and n is a number of 1 to 3.

$R^1$, $R^2$ and $R^3$, independently from each other, represent a hydrogen atom, an alkyl group having 1 or 2 carbon atoms (methyl or ethyl), or a hydroxyalkyl group having 1 to 3 carbon atoms (hydroxymethyl, alpha- or beta-hydroxyethyl or hydroxypropyl). n is 1, 2 or 3. Examples of the above cation exchange groups are quaternary ammonium groups derived from amino groups, such as aminoethyl, diethylaminoethyl and diethyl(2-hydroxypropyl)aminoethyl or trimethylaminomethyl.

Preferred anionic exchange groups are those of the following formula

wherein Z represents a carboxyl group (—COOH), a sulfo group (—SO$_3$H) or a phosphoryl group (—PO$_3$H$_2$), and m is 0 or a number of 1 to 3.

Examples of the anion groups are carboxyl, sulfo, phosphoryl, carboxymethyl, carboxyethyl, sulfoethyl, and phosphoryltrimethylene groups.

Preferably, the fine particles of ion-exchanged cellulose of this invention further have the following properties.

They are basically composed of a II-type crystalline cellulose phase and an amorphous cellulose phase.

They have a crystallinity, determined by X-ray diffractometry, of preferably 5 to 50%, more preferably 10 to 45%, and especially preferably 20 to 40%.

Preferably, the crosslinked ion-exchanged fine cellulose particles of this invention have relatively high pressure resistance in the wet state which is preferably at least 5 kg/cm², for example. For separating and purifying large quantities of high-molecular-weight compounds such as protein on an industrial scale, fine ion-exchanged cellulose particles having higher pressure resistance in the wet state are more useful. More preferably, they have a pressure resistance in the wet state of at least 10 kg/cm². According to this invention crosslinked ion-exchanged fine cellulose particles having a pressure resistance in the wet state of at least 40 kg/cm², or at least 80 kg/cm² can be produced. If the particle diameter of the fine cellulose particles becomes small when they are filled in the same column, the pressure of the column increases. Since the crosslinked ion-exchanged fine cellulose particles of the invention having a particle diameter of 10 micrometers can withstand a column pressure of as high as 80 kg, various particle sizes can be selected advantageously according to the desired separation accuracy and the desired amount of treatment.

The exclusion limit molecular weight of the ion-exchanged fine cellulose particles of the invention is preferably higher than 500 but lower than 1,000,000, more preferably higher than 1,000 but lower than 500,000. This exclusion limit molecular weight is determined by using polyethylene glycol as a high-molecular-weight substance.

They have a fractionation index (F) defined by the following equation of preferably at least 0.6, more preferably at least 1.0 and especially preferably at most 3.

$$F = \frac{V_E - V_D}{V_D}$$

wherein $V_D$ is elution volume (ml) of the blue dextran (molecular weight 2 millions), and $V_E$ is the elution volume (ml) of ethylene glycol.

The above ion-exchanged fine cellulose particles of this invention can be used for isolating and purifying various substances.

It has been found that ion-exchanged fine cellulose particles having the following properties can be advantageously used as an affinity carrier.

Thus, according to this invention, there is provided an affinity carrier composed of porous fine cellulose particles characterized in that (a) they are composed substantially of spherical or long spherical particles having a particle diameter in the wet state of not more than 500 micrometers, (b) they are composed of a crystalline cellulose phase and an amorphous crystalline phase, (c') they have a crystallinity, determined by X-ray diffractometry, of 5 to 45%, (d) in the relation between the pore diameter and the pore volume of particles subjected to critical drying which is measured by a mercury porosimeter method, they have a maximum pore volume value within a pore diameter range of 0.006 to 1 micrometer, and the total volume of pores within the above range is at least 0.05 ml/g, (e) the amount of albumin that can be introduced into the cellulose particles is at least 30 mg/g, and (f) they have a pressure resistance in the wet state of at least 5 kg/cm².

Of these properties (a) to (f), the properties (a), (b), (c') and (d) are as described hereinabove. In addition, the porous fine cellulose particles as the affinity carrier fourthly have the characteristic that the amount of albumin that can be introduced thereinto is at least 30 mg/g, preferably at least 50 mg/g.

Fifthly, the porous fine cellulose particles of the invention have a pressure resistance of at least 5 kg/cm², preferably at least 20 kg/cm², especially preferably at least 60 kg/cm².

Preferably, the porous fine cellulose particles of the invention have two clear distinct peaks at a diffraction angle (2θ) of 20.0±0.3° and 21.8±0.3°.

Various ligands can be introduced into the affinity carrier composed of the porous fine cellulose particles of the invention.

Examples of the ligands that can be introduced into the affinity carrier of this invention are antibodies which bind to various antigens according to the purposes intended, protein A which binds to immunoglobulin IgG, peptides having affinity for enzymes, modified proteins and peptides, amino acids, coenzymes, vitamins, receptor proteins for lipids, steroids and hormones, dyes, polynucleotides, saccharides, and glycoproteins such as lectin.

Examples of the method of introducing ligands includes a method comprising introducing active groups into the porous fine cellulose particles using cyanogen bromide, a method comprising oxidizing the porous fine cellulose particles with periodic acid to produce aldehyde groups as active groups, a method comprising treating the porous fine cellulose particles with bromoacetyl bromide to introduce acetyl halide groups, a method comprising reacting the porous fine cellulose particles with cyanuric chloride to form cyanuric cellulose, a method comprising reacting the porous fine cellulose particles with epichlorohydrin to introduce epoxy groups, and a method comprising reacting the resulting porous fine epoxidized cellulose particles with ammonia to introduce amino groups or reacting the cyanogen bromide-treated porous fine cellulose particles produced by the above method with diaminoethane to introduce amino groups, and thereafter reacting the resulting products with glutaraldehyde to introduce aldehyde groups. The introduction of ligands into the affinity carrier of the invention is not limited to the above-cited methods, but the method of introduction may be selected according to the type, properties and chemical structure of the ligand. Generally, it is desirable to apply methods used for the above polysaccharide-type carriers.

Since the reactive groups introduced into the carrier by these methods react with the ligands under mild conditions, the ligands can be easily bound to the carrier. The amount of the ligands introduced may be properly selected according to the purpose and the separating conditions.

There is an optimal amount in the amount of ligands bonded which is required in actual affinity separation, and larger amounts of the ligands bonded do not necessarily bring about better results. The amount of ligand bonding cannot be generally determined. Since the amount of active groups that can be bonded is large, the amounts of the ligands to be bonded can be prescribed within a broad range as is required. Furthermore, since the affinity carrier of this invention has high strength although it may vary slightly depending upon the method of production, it has a pressure resistance of as good as at least 5 kg/cm² as stated above when filled in a column. Accordingly, another characteristic is that the affinity carrier of the invention can be used at a high flow rate as required. Still another feature of the affinity carrier is that it has extremely low non-specific absorption of components other than that which is to be separated. Particularly, even when separation is carried out under conditions of a low ionic strength, hardly any non-specific adsorption of proteins is observed, and separation and purification by the affinity carrier can be effected with high efficiency. The porous fine cellulose particles of the invention have excellent properties as the affinity carrier as stated above, and are also economical because they can be prepared from cellulose which occurs widely at low costs as raw material. As shown in working examples given below, in a separating-purifying step which was actually performed under pressure using the porous fine cellulose particles of this invention having ligands introduced therein, goods results were obtained.

By the present invention, the ion-exchanged fine cellulose particles (including the porous fine cellulose particles; this applies hereinafter unless otherwise specified) can be produced by the following method.

A method comprising (1) preparing fine coagulated viscose particles containing 5 to 60% by weight, calculated as cellulose, of cellulose xanthate, (2) regenerating cellulose by (2-1) directly neutralizing the fine coagulated viscose particles with an acid, or (2-2) subjecting the fine coagulated viscose particles to a crosslinking reaction and then neutralizing the reaction product with an acid, or (2-3) neutralizing the fine coagulated viscose particles with an acid and subjecting the neutralization product to a crosslinking reaction, and thereafter (3) introducing ion-exchange groups into the resulting fine cellulose particles in a uniform alkaline solvent.

By the method of this invention, fine coagulated viscose particles containing 5 to 60% by weight, calculated as cellulose, of cellulose xanthate are prepared by the first step. The fine coagulated viscose particles can firstly be produced by (A) preparing an alkaline aqueous solution of cellulose xanthate and a first water-soluble polymeric compound other than cellulose xanthate, (B) mixing the alkaline aqueous solution of polymers with a second water-soluble anionic polymeric compound to form a dispersion of fine particles of the alkaline aqueous solution of polymers, and (C) heating the dispersion, or mixing the dispersion with a coagulating agent for cellulose xanthate to coagulate cellulose xanthate in the dispersion as fine particles containing the first water-soluble polymeric compound.

Secondly, the fine coagulated viscose particles used in the first step of the method of this invention can be produced also by (A) preparing an alkaline aqueous solution of cellulose xanthate and a first water-soluble polymeric compound other than cellulose xanthate, (B) mixing the alkaline aqueous solution of polymers with water-soluble polyethylene glycol or polyethylene glycol derivative having a number average molecular weight of at least 1,500 to produce a dispersion of fine particles of the alkaline aqueous solution of polymers at a temperature of at least 55° C., and (C) heating the dispersion at a temperature equal to, or higher than, the temperature used for producing the dispersion above, or mixing the dispersion with a coagulating agent for cellulose xanthate to coagulate the cellulose xanthate in the dispersion as fine particles containing the first water-soluble polymeric compound.

The first and second methods basically consisting of the same steps, i.e., (A) the step of preparing an alkaline aqueous solution of cellulose xanthate and the first water-soluble polymeric compound, (B) the step of forming a dispersion of the fine particles of the alkaline aqueous solution of polymers, and (C) the step of forming fine particles containing cellulose.

The first method differs from the second method in that the second polymeric compound used in step (B) is anionic in the first method, while it is non-anionic in the second method. The first method of producing the fine coagulated viscose particles used in this invention will be first described.

According to the first method, an alkaline aqueous solution of cellulose xanthate and a first water-soluble polymeric compound other than cellulose xanthate is prepared in step A, and in step B, a dispersion of fine particles of the alkaline aqueous solution of polymers is prepared. In step C, fine particles containing the first water-soluble polymeric compound are formed. Step A of preparing the alkaline aqueous solution of cellulose xanthate and the first water-soluble polymeric compound other than cellulose xanthate can be carried out by dissolving cellulose xanthate and the first water-soluble polymeric compound other than cellulose xanthate simultaneously in water or an alkaline aqueous solution; or first dissolving cellulose xanthate in water or an alkaline aqueous solution and dissolving the first water-soluble polymeric compound in the resulting viscose; or dissolving the first water-soluble polymeric compound in water or in an alkaline aqueous solution and then dissolving cellulose xanthate in the solution.

The above dissolving operations can be carried out by mixing with a kneader or a high-viscosity agitating vane.

Cellulose xanthate may be that obtained as an intermediate in a rayon producing process or a cellophane producing process. A suitable example is cellulose xanthate having a cellulose concentration of 33% by weight, an alkali concentration of 16% by weight and a gamma value of about 40.

Nonionic or anionic polymeric compounds may be conveniently used as the first water-soluble polymeric compound. Examples of the nonionic first water-soluble polymeric compound are polyethylene glycol, polyethylene glycol derivatives, and polyvinyl pyrrolidone. These polymeric compounds have a number average molecular weight of, for example, at least 400, preferably 600 to 400,000.

The polyethylene glycol derivatives may preferably includes, for example, water-soluble compounds resulting from blocking the hydroxyl group at one end of polyethylene glycol with an alkyl groups having 1 to 18 carbon atoms, a phenyl group substituted by a $C_1$-$C_{18}$ alkyl group, or an acyl group having 2 to 18 carbon atoms, and block copolymers of the A—B—A' type in which A and A' are identical or different and each represents a polyethylene oxide block, and B represents a polypropylene oxide block. Specific examples are polyethylene glycol monomethyl ether, polyethylene glycol monolauryl ether, polyethylene glycol monocetyl ether, polyethylene glycol monomethyl phenyl ether, polyethylene glycol monononyl phenyl ether, polyethylene glycol monoacetate, polyethylene glycol monolaurate, and polyoxyethylene block-polyoxypropylene block-polyoxyethylene block.

The anionic first water-soluble polymeric compounds are preferably those containing a sulfonic acid group, a phosphonic acid group or a carboxylic acid group as an anionic group. These anionic groups may be in the form of free acids or salts.

In the first water-soluble polymeric compounds having a sulfonic acid group as the anionic group, the sulfonic acid group may be derived from monomers such as vinylsulfonic acid, styrenesulfonic acid, methylstyrenesulfonic acid, allylsulfonic acid, methallylsulfonic acid, acrylamidomethylpropanesulfonic acid or salts of these.

Likewise, the first water-soluble polymeric compounds having a phosphonic acid group as the anionic group may be derived from monomers such as styrenephosphonic acid, vinylphosphonic acid or salts of these.

The water-soluble polymeric compounds having a carboxylic acid group as the anionic group may be derived from monomers such as acrylic acid, methacrylic acid, styrenecarboxylic acid, maleic acid, itaconic acid or salts of these.

For example, a first water-soluble polymeric compound having a carboxylic acid group can be produced by polymerizing sodium acrylate alone or a mixture of it with another copolymerizable monomer such as methyl acrylate, and supplied as a homopolymer or a copolymer containing sodium acrylate units. Furthermore, a water-soluble polymeric compound having a sulfonic acid group may be produced by, for example, sulfonating a homopolymer of styrene.

The same can be said with regard to the case where the sulfonic acid group is derived from monomers other than styrenesulfonic acid, and the case where the sulfonic acid group and the carboxylic acid group are derived from the above-exemplified monomers.

The water-soluble first anionic polymeric compound preferably contains at least 20 mole % of units of the above monomer having the anionic group. Such preferred polymeric compounds include both homopolymers and copolymers.

The water-soluble anionic polymeric compounds preferably have a number average molecular weight of at least 5,000, preferably 10,000 to 3,000,000.

The water-soluble anionic polymeric compounds used in step A are not limited to the above-described vinyl-type polymers but include other polymers such as carboxymethyl cellulose, sulfoethyl cellulose and salts (such as Na salt) of these.

By the first method, the alkaline aqueous solution of polymers prepared in step A is then mixed with a second water-soluble anionic polymeric compound by step B.

The mixing can be carried out by using any means by which a dispersion of fine particles of the alkaline aqueous solution of polymers can be formed. For example, mechanical agitation by agitating vanes or baffle plates, ultrasonic agitation and mixing by a static mixer may be employed singly or in combination.

The second water-soluble anionic polymeric compound is used preferably as an aqueous solution, more preferably as an aqueous solution containing 0.5 to 25% by weight, especially 2 to 22% by weight, of the second polymeric compound. Preferably, the aqueous solution has a viscosity at 20° C. of 3 to 50,000 centipoises, especially preferably 5 to 30,000 centipoises.

The second water-soluble anionic polymeric compound is used in an amount of 0.3 to 100 parts by weight, preferably 1 to 45 parts by weight, especially preferably 4 to 20 parts by weight, per part by weight of cellulose in the alkaline aqueous solution of polymers. Advantageously, the alkaline aqueous solution of polymers and the second water-soluble anionic polymeric compound are mixed at a temperature lower than the boiling point of carbon disulfide contained in the alkaline aqueous solution of polymers, preferably at 0° to 40° C.

Investigations of the present inventors show that when an acid-decomposable inorganic salt such as calcium carbonate is used in an amount of, for example, 0.5 to 5% by weight as a dispersing agent in the alkaline aqueous solution of polymers in step A, the form of the fine particles in the dispersion formed in the second step is retained stably and maintained good.

Examples of the second water-soluble anionic polymeric compound may be the same as those of the first water-soluble polymeric compound given hereinabove. The second water-soluble anionic polymeric compound may be the same as, or different from, the first water-soluble polymeric compound.

By the method of producing the fine coagulated particles, the dispersion of fine particles of the alkaline aqueous solution of polymers formed in step B is then coagulated in step C.

Desirably, the reaction of the coagulation is carried out while performing a mixing operation on the resulting dispersion.

Coagulation by heating can be advantageously carried out at a temperature above the boiling point of carbon disulfide contained in the alkaline aqueous solution of polymers, for examle at 50° to 90° C. In the case of coagulation by using a coagulating agent, it is not necessary to elevate the temperature to such a level, and it can usually be carried out at a temperature of 0° to 40° C. As the coagulating agent, lower aliphatic alcohols, alkali metal or alkaline earth metal salts of inorganic acids, and combinations of these with third water-soluble polymeric compounds are preferably used. The lower aliphatic alcohols may be linear or branched, and aliphatic alcohols having 1 to 4 carbon atoms, such as methanol, ethanol, isopropanol, n-propanol and n-butanol, are preferably used. The alkali metal salts of inorganic acids may preferably be sodium salts such as $Na_2Cl$ and $Na_2SO_4$ and potassium salts such as $K_2SO_4$. The alkaline earth metal salts of inorganic acids may preferably be magnesium salts such as $MgSO_4$ and calcium salts such as $CaCl_2$.

Nonionic and anionic polymeric compounds, for example, may be used preferably as the third water-soluble polymeric compounds. It is especially desirable to use the second anionic polymeric compounds used in step B as the third water-soluble polymeric compounds. Examples of the third water-soluble polymeric compounds will be understandable from the examples of the first water-soluble polymeric compound.

The coagulating agent may be used in a proportion of, for example, about 20 to 300% by weight, based on cellulose in the viscose.

The second method of producing the coagulated viscose particles used in this invention will now be described.

By the second method, an alkaline aqueous solution of polymers is prepared from cellulose xanthate and the first water-soluble polymeric compound other than cellulose xanthate by step A; a dispersion of fine particles of the alkaline aqueous solution of polymers is formed by step B; and fine particles containing cellulose are formed by step C. Thus, it is basically the same as the first method stated above. Step A of preparing an alkaline aqueous solution of cellulose xanthate and the first water-soluble polymeric compound other than cellulose xanthate is carried out in the same way as the first method of production described above. For example, cellulose xanthate and the first water-soluble polymeric compound other than cellulose xanthate may be the same as those described with regard to the first method of production.

Step B of forming a dispersion of fine particles of the alkaline aqueous solution of polymers is carried out by mixing the alkaline aqueous solution of polymers with water-soluble polyethylene glycol or a polyethylene glycol derivative each having a number average molecular weight of at least 1,500.

The polyethylene glycol or polyethylene glycol derivative used has a number average molecular weight of at least 1,500, preferably 1,500 to 400,000.

The polyethylene glycol derivative may suitably be, for example, water-soluble compounds resulting from blocking the hydroxyl group of only one end of polyethylene glycol with an alkyl group having 1 to 18 carbon atoms, a phenyl group substituted by $C_1$-18 alkyl, or an acyl group having 2 to 18 carbon atoms, or block copolymers of the A-B-A' type in which A and A' are identical or different and each represents a polyethylene oxide block, and B represents a polypropylene oxide block. Specific examples are polyethylene glycol monomethyl ether, polyethylene glycol monolauryl ether, polyethylene glycol monocetyl ether, polyethylene glycol monomethylphenyl ether, polyethylene glycol monononyl phenyl ether, polyethylene glycol monoacetate, polyethylene glycol monolaurate and polyoxyethylene block-polypropylene block-polyoxyethylene block.

Among the polyethylene glycol and its derivatives, polyethylene glycol is preferred. Its number average molecular weight is preferably 6,000 to 200,000, especially preferably 8,000 to 100,000, above all 10,000 to 30,000. The polyethylene glycol derivatives preferably have a number average molecular weigt of 1,500 to 16,000.

By the second method, the alkaline aqueous solution of polymers is mixed with the water-soluble high-molecular-weight polyethylene glycol or its derivative in step B. The mixing may be carried out by any means by which a dispersion of fine particles of the alkaline aqueous solution of polymers can be formed. Specific means are as described above with regard to the first method of production.

The water-soluble high-molecular-weight polyethylene glycol or its derivative is used preferably as an aqueous solution, more preferably as an aqueous solution containing 0.5 to 60% by weight, especially preferably 5 to 55% by weight, above all 10 to 40% by weight, of the polyethylene glycol or its derivative.

The polyethylene glycol or its derivative is used in an amount of 1 to 30 parts by weight, preferably 2 to 28 parts by weight, especially preferably 4 to 24 parts by weight, above all 8 to 16 parts by weight, per part by weight of cellulose. There is no particular limit to the temperature at which the mixing is carried out. Desirably, the mixing is carried out at a temperature lower than the temperature at which the dispersion of fine particles of the alkaline aqueous solution of polymers is formed. The dispersion of fine particles of the alkaline aqueous solution of polymers is formed at a temperature of at least 55° C. At temperatures lower than 55° C., a dispersion of fine particles of the alkaline aqueous solution of polymers, which becomes a basis for giving desirable fine cellulose particles, cannot be obtained.

In the second method, the dispersion of fine particles of the alkaline aqueous solution of polymers is then coagulated by step C.

The above reaction of coagulation is carried out at a temperature equivalent to, or higher than, the temperature at which the dispersion is formed. Coagulation by heating and coagulation by using a coagulating agent are carried out preferably at a temperature of 60° to 90° C. Coagulation may also be carried out at temperatures below 60° C. using a coagulating agent.

The coagulating agent and its proportion are as described hereinabove with regard to the first method of production.

The use of the coagulating agent in combination with polyethylene glycol or its derivative has the advantage that the coagulation of the dispersion can be carried out stably because the decrease of the concentration of polyethylene glycol or its derivative by the addition of the coagulating agent can be prevented.

The coagulated viscose fine particles obtained by the first and second methods described above are composed substantially of spherical to long-spherical particles having an average particle diameter of 400 micrometers, and contain 5 to 60% by weight (calculated as cellulose) of a cellulose component. The cellulose component of the fine coagulated viscose particles is quantified after the fine particles are washed with an excess of n-hexane to remove water and the water-soluble polymeric compounds adhering to their surface, dried at 50° C. for 60 minutes to remove the adhering n-hexane, and dried at 105° C. for 3 hours. When the fine particles contain the polymeric materials, they are washed with water to remove them before the cellulose component is quantified. Removal of the polymeric compounds in the fine coagulated viscose particles is carried out with 0.5-2% by weight sodium hydroxide at a temperature of 20° to 30° C.

The fine viscose particles from which the polymeric compounds have been removed in the first step are either (1) neutralized directly with an acid to regenerate cellulose, (2) subjected to a crosslinking reaction and then neutralized with an acid to regenerate cellulose, or (3) neutralized with an acid and then subjected to a crosslinking reaction to regenerate cellulose, thereby forming fine cellulose particles.

The treatment (1) gives non-crosslinked fine cellulose particles.

The treatment (2) or (3) gives crosslinked fine cellulose particles.

Epichlorohydrin and dichlorohydrin, for example, may be used as the crosslinking agent. The crosslinking reaction in the treatment (2) is carried out on the fine coagulated viscose particles in a liquid medium containing an alkali hydroxide. In the treatment (3), the regenerated fine cellulose particles are crosslinked in a liquid medium containing an alkali hydroxide. When the alkali hydroxide is sodium hydroxide, the liquid medium contains it in a concentration of 5 to 25% by weight, preferably 5 to 15% by weight. By varying the concentration of the alkali hydroxide, the pore diameter of the resulting cellulose particles can be adjusted. The crosslinking agent is adjusted to a concentration of 3 to 25% by weight in the liquid medium containing the alkali hydroxide. By varying the amount of the crosslinking agent, the crosslinking density and strength of the fine cellulose particles can be adjusted. Water, or methanol, ethanol, or acetone which is miscible with water and is a good solvent for the crosslinking agent, or a mixture of water and the above solvent is used as the liquid medium.

The liquid medium is used in an amount of 10 to 30 parts by weight per part by weight of cellulose. The crosslinking reaction is carried out usually at a temperature of 50° to 80° C. although it may vary depending upon the liquid medium.

It is presumed that the crosslinkage between the cellulose molecular chains will exist in the form of cellulose molecules in which the hydroxyl groups are substituted by hydroxyl groups, or in the form of cellulose molecules in which the hydroxyl groups are substituted by hydroxyl groups and interrupted by oxygen atoms and partly as a grafted branch.

In the treatments (1), (2) and (3) above, the acid used to convert viscose to cellulose is preferably an inorganic strong acid such as sulfuric acid or hydrochloric acid.

Thereafter, in the third step of the invention, ion-exchange groups are introduced into the fine cellulose particles. As the ion exchange groups, examples of the cation exchange groups are groups of the following formula

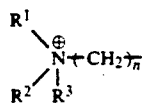

wherein $R^1$, $R^2$ and $R^3$ are as defined hereinabove, and examples of the anion exchange group are those of the following formula

wherein Z and m are as defined above.

Specific examples of the above cation exchange groups are quaternary groups of amino groups such as an aminoethyl, diethylaminoethyl, diethyl-(2-hydroxypropyl)aminoethyl, or trimethylamino group. Examples of the anion-exchange group of the above formula include a carboxyl group, a sulfo group and a phosphoryl group.

Introduction of the ion-exchange group is not particularly limited, and may be carried out by methods known per se. For example, the fine cellulose particles are fully swollen with an aqueous solution of sodium hydroxide, and then reacted with a compound capable of yielding the above ion exchange groups, for example 2-chlorotriethylamine hydrochloride or monochloroacetic acid, for example at 70° C. for 60 minutes.

Porous ion-exchanged fine cellulose particles having further improved strength can be produced by performing the following fourth step following the first, second and third steps.

The fourth step is carried out by subjecting the crosslinked ion-exchanged cellulose particles to a crosslinking reaction in an organic medium or to a heat-treatment. This crosslinking reaction may be carried out under substantially the same conditions as in the crosslinking reaction carried out in the second step except that the liquid medium in which the crosslinking reaction is carried out is limited to an organic medium such as dimethyl sulfoxide (DMSO), methanol, ethanol, acetone or mixtures of these.

The heat-treatment is carried out at a temperature of 60° to 120° C. in the dry or wet state. A vacuum dryer, an autoclave or a hot air dryer and an evaporator which are generally used may be cited as a heat-treating machine.

The sufficient heat-treatment time is usually 20 minutes to 3 hours. The heat-treatment characteristics may be varied depending upon the crosslinking conditions for crosslinked fine cellulose particles to be heat-treated. When the concentration of the crosslinking agent in the crosslinking reaction in the second step is as high as 20 to 25% by weight, and the concentration of the alkali hydroxide in the liquid medium is as high as 8 to 12% by weight, porous ion-exchanged fine cellulose particles having a decreased exclusion limit molecular weight can be obtained while maintaining the F value at a high level. By performing the heat treatment under properly selected crosslinking conditions, porous crosslinked ion-exchanged fine cellulose particles having various strengths, F values and exclusion limit molecular weights can be obtained.

In the present invention, the heat treatment may be carried out before the third step. In other words, the third step can be carried out after the heat-treatment is performed. This heat-treatment may also be carried out under the same conditions as above. The heat-treatment in the fourth step is carried out as a final step. But since this heat-treatment is carried out before the ion-exchange group is introduced, the heat-treated fine cellulose particles having a different amount of the ion-exchange group and a different distribution of the ion-exchange groups from crosslinked porous fine cellulose particles which are obtained without performing this heat-treatment.

The porous fine celulose particles used as the affinity carrier of the invention are obtained by performing the above first and second step, and then instead of the third and subsequent steps described above, separating the resulting fine cellulose particles from the mother liquor. After separation, the fine particles may, as required, be desulfurated, washed with an acid, and water or methanol, and thereafter, or after the above separation, the product may be heat-treated.

Desulfuration may be performed with an aqueous solution of an alkali such as sodium hydroxide or sodium sulfide. If required, to remove the remaining alkali, the particles are then washed with an acid such as dilute hydrochloric acid, water or methanol.

The ion-exchanged fine cellulose particles used in this invention have various micropores, micropore distributions and a large pore volume. Hence, they are characterized in that their ion exchange capacity can be increased without severely performing swelling at the time of introducing ion-exchange groups. Accordingly, the cellulose particles of the invention can exhibit high pressure-resistant strength when filled in a column. Another advantage is that since the amount of micropores is large, the specific surface area of the fine cellulose particles increases, and they have a large treating volume.

EXAMPLES

Figure 1:
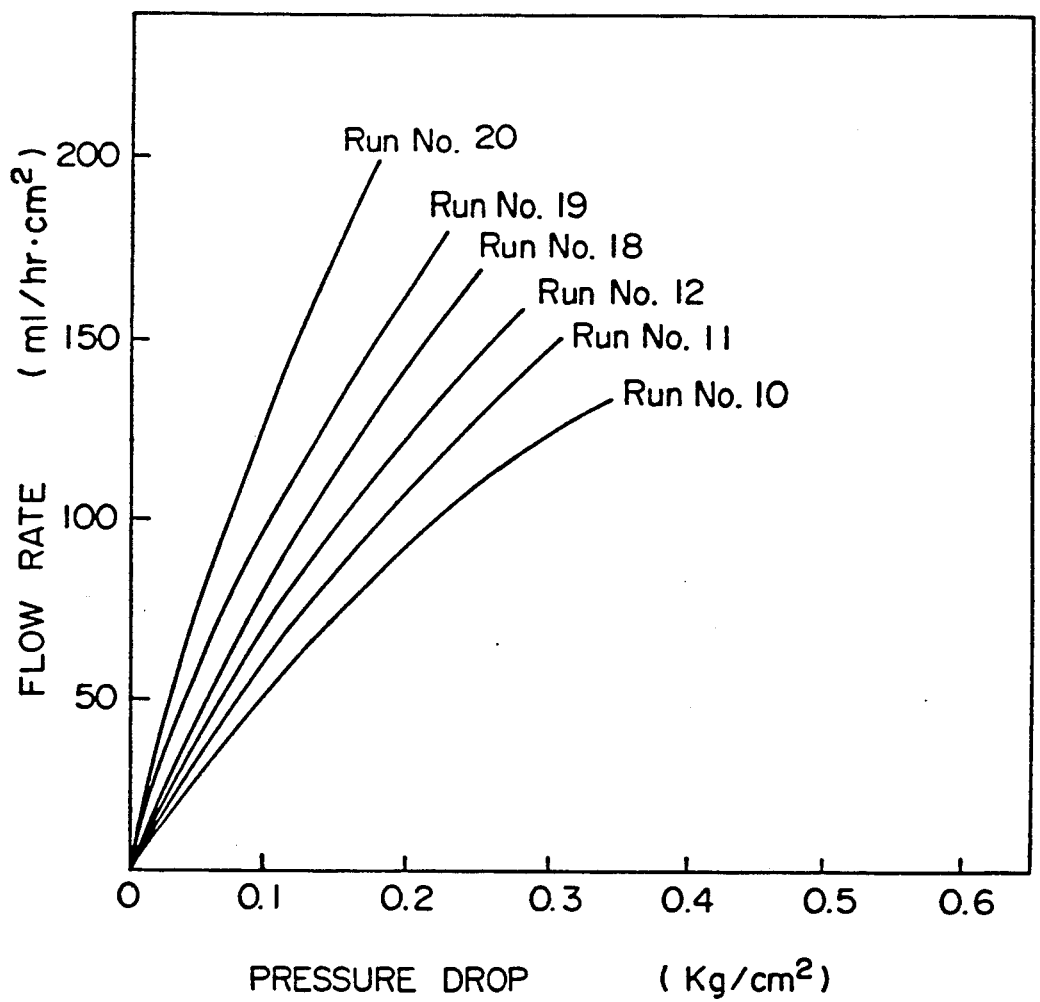
FIG. 1 shows the relation between the flow rate and the pressure drop in the crosslinked ion-exchanged fine cellulose particles.

The following examples will illustrate the present invention in detail.

The methods of measuring the various properties in the present specification will first be described below.

Method of measuring the particle diameter

About 0.1 g of a sample was taken and put in 25 ml of deionized water and dispersed with stirring. The particle size distribution was measured by a light-transmission type particle size distribution measuring device. The average particle diameter was calculated on a volume basis.

Method of measuring the diameter and volume of pores

The pore size distribution was measured by a mercury penetration-type porosimeter, PORE SIZER 9310 (made by Micromeritics). By a conventional method, the relation between the pressure applied and the amount of mercury penetrated was measured, and the data were processed on the basis of the following formula.

$$P.D = -4K.\sigma b \, 1 \cos \theta$$

$$V = (Q/H)/S$$

wherein
P: the pressure applied,
D: the diameter of a pore in which mercury could penetrate under a pressure P,
$\sigma$: the surface tension of mercury (484 dynes/cm) of mercury,
$\theta$: the contact angle (130°) of mercury with respect to the sample,
K the cell constant (10.79),
V: the pore volume,
H: the density of mercury (13.5389 g/cc),
Q: the amount of mercury penetrated (cc),
S: the amount of the sample (g).

The measuring sample was dried by the following critical drying method.

Critical drying method

To determine accurately the porous property of cellulose particles swollen with water, the structure of cellulose was fixed by the critical drying method while retaining the swollen state.

1. Dehydration

Water in the cellulose particles was replaced by ethanol. The ratio of ethanol to water was gradually changed to an ethanol-rich ratio from 50/50, and finally water was replaced by 100% ethanol.

2. Solvent replacement

The ethanol in the cellulose particles was replaced by isoamyl acetate. The ratio of isoamyl acetate to ethanol was changed gradually to an isoamyl acetate-rich ratio from 50/50, and finally the ethanol was replaced by 100% isoamyl acetate.

3. Drying

The dehydrated and fixed cellulose particles in isoamyl acetate was subjected to critical drying with carbon dioxide gas by a Hitachi critical drying device HCP-2 type.

Molecular weight fractionation characteristics

Fine cellulose particles were filled in resin columns (9 mm in diameter and 15 cm in length) over 60 minutes at a flow rate of 4.0 ml/min. using water as a filling liquid. The filled columns were then used as separation columns, and using standard polyethylene glycol of a known molecular weight under the following conditions, the relation between the elution time and the molecular weight was plotted. The exclusion limit molecular weight was determined as the molecular weight of polyethylene glycol at a flexural point of the curve.

The fractionation index (F) was determined from the following formula $$F = \frac{V_E - V_D}{V_D}$$

wherein
$V_D$: the elution volume (ml) of blue dextran (molecular weight 2 millions), and
$V_E$: the elution volume (ml) of ethylene glycol.

Analysis conditions

1. Pump: Peristaltic pump SJ-1211H type made by Ato Co., Ltd., or 6000A type made by Waters Co.
2. Eluting liquid: deionized water
3. Flow rate: 1.0 ml/min.
4. Temperature: room temperature
5. Detector: RI detector

Crystal form and crystallinity

Fine cellulose particles dried in the air after replacement with methanol were subjected to X-ray diffractometry. II type cellulose can be identified from the fact that two peaks appear at a diffraction angle $2\theta$ of about 20° and 21.8°. The crystallinity of the particles is defined as follows from the X-ray diffraction pattern.

$$\text{Crystallinity } X = \frac{(c - a)}{k \times (c - b)} \times 100(\%)$$

K = 0.896 (a non-interfering scattering correction coefficient of cellulose; and a, b and c are areas surrounded by the diffraction curve and the base line between a diffraction angle $2\theta$ of 5° and 45°, and correspond to the following measurment.
a: amorphous starch
b: air scattering
c: sample

Average degree of polymerization

Measured by the method described in JIS L-1015.

Measurement of the ion exchange capacity

The ion-exchanged cellulose particles purified and dried by the procedures 1 and 2 below were precisely weighed, and the ion-exchange capacity of the cellulose particles was determined by the procedure 3.

1. Washing and purification

The ion-exchanged cellulose particles were taken into a glass filter, and deionized water in an amount about 25 times the volume of the wet cellulose particles was allowed to flow into the filter to wash the cellulose particles. Then, the washed particles were immersed in 1N HCl, and dehydrated by suction. This operation was repeated twice. Then, they were immersed in 1N NaCl and dehydrated by suction, and this operation was repeated twice. Again, the cellulose particles were washed with about 25 times their volume of deionized water. Finally, the cellulose particles were immersed in 1N HCl, suction-filtered, and fully washed with a large amount of deionized water.

2. Drying

The washed cellulose particles were dehydrated by suction, and dried by an air dryer at 50° C. until the particles reached a constant weight.

3. Calculation of the ion-exchange capacity

About 1 g of the dried cellulose particles was precisely weighed. In the cationized particles, the amount of a liberated $Cl^-$ ion in the cellulose particles was titrated with 1/10N $AgNO_3$ using a 5 % $K_2CrO_4$ solution as an indicator in 1N $KNO_3$.

$$\text{Ion-exchange capacity (meq/g)} = \frac{\text{Amount (ml) of 1/10N } KNO_3 \text{ consumed} \times f}{\text{Weight (g) of dry cellulose particles}} \times \frac{1}{10}$$

($f$ is a factor of 1/10N $AgNO_3$.)

In the case of anionized particles the liberated $H^+$ was neutralized and titrated with 1/10N NaOH using 0.1% methyl orange as an indicator in 1N NaCl.

$$\text{Ion-exchange capacity (meq/g)} = \frac{\text{Amount (ml) of 1/10N NaOH consumed} \times f}{\text{Weight (g) of dry cellulose particles}} \times \frac{1}{10}$$

($f$ is a factor of 1/10N NaOH.)

Measurement of the amount of bovine serum albumin (BSA) adsorbed

About 2 ml of the wet particles were filled in a resin column (9 mm in diameter and 15 cm in length). The gel was equilibrated with a buffer (0.01M Tris-HCl, pH 8.3). BSA (55 mg/ml) dissolved in the buffer was added until a UV monitor became constant. The column was washed with the buffer. The buffer containing 1M NaCl was added to elute the bound BSA, and the eluted fractions were separated. The fractionated fractions were collected in a measuring flask, and the UV (280 nm) absorption was measured. The amount of BSA adsorbed (A mg/ml) per unit volume of the gel was calculated from the following formula.

$$A = \frac{A_{280} \times V_m}{E \times V_G}$$

wherein $A_{280}$: the absorbance of the solution at 280 nm in a 1 cm cell, $V_m$: the amount of the liquid separated into the measuring flask, E: the absorbance of a standard solution (1 mg/ml) at 280 nm in a 1 cm cell (in the case of BSA, E=0.646), and $V_G$: the volume of the gel equilibrated with the buffer.

Absorbance of the CH stretching absorption band

Fine cellulose particles (1 to 3 g) were precisely weighed, and about 200 ng of a potassium bromide powder (KBr for short) for infrared absorption spectroscopy was precisely weighed. The two were well kneaded and pulverized in an agate mortar. The mixed powder of the cellulose and KBr was collected and by a tableting machine, KBr tablets for infrared absorption spectroscopy were prepared. The infrared absorption spectrum of the tablets was measured by the transmission method. In the resulting absorption band having a peak at 2,800 to 3,000 $cm^{-1}$ was determined, and calculated for the absorbance per mg of the cellulose.

The absorbance of the CH stretching absorption band per mg of the fine cellulose particles is expressed by the following formula.

$$Ao = \frac{A(M + w)}{m \cdot w}$$

wherein w: the amount (mg) of the fine cellulose particles sampled,

M: the amount (mg) of the KBr powder sampled, m: the weight (mg) of the KBr tablets, A: the absorbance of the CH stretching absorption bands, T(P): the transmittance (%) at the peak top of the CH stretching absorption band, T(b): the transmittance (%) of the base line at a peak wave number of the CH stretching absorption band (the base line was drawn such that in a range of 2,000 to 40,000 $cm^{-1}$, the OH stretching absorption band and the two peak bottoms of the CH stretching absorption band are scooped up with a tangent.

Ao: the absorbance of the CH stretching absorption band per mg of the fine cellulose particles.

$$A = \log_{10} T(b)/T(P)$$

Separately, the following measurements were made on the affinity carrier.

Measurement of the pore diameter-pore volume in the wet state

Water in the water-wetted particles was replaced by ethanol, and then completely replaced by isoamyl acetate. Then, the particles were subjected to carbon dioxide critical drying. The pore diameter and the pore volume of the dried particles were measured by means of a mercury porosimeter.

Amount of active groups introduced

The cellulose particles were activated at a pH of 11 with cyanogen bromide in an amount corresponding to three equivalents per equivalent of the carbohydrate unit structure, and reacted with 0.12M borax buffer (pH 9.0) containing bovine serum albumin (BSA) in the same amount as the dry weight of the cellulose particles (BSA concentration 2.5% by weight) at 4° C. for 20 hours. The amount of the remaining BSA in the solution was measured to determine the amount of bound BSA per unit amount of dry particles. The determined amount was defined as the amount of active groups introduced (wt/wt).

Pressure resistance of the wet particles

As a standard measuring method, fine cellulose particles subjected to a swelling pretreatment in water for 18 hours were filled downwardly from top in a stainless steel column (equipped with a sintered filter having a pore diameter of 2 micrometers) having an inside diameter of 4 mm and a length of 150 mm and set up perpendicularly using water. The flow rate-pressure drop curve was determined when water was passed downwardly through this column from top. The pressure drop at a point where the inclination of the tangent (pressure/flow rate) in this curve was 8 times the inclination at a flow rate of 0 ml/min. was determined and defined as the pressure resistance of the wet particles.

EXAMPLE 1

Pulp (500 g) from a conifer was steeped in 20 liters of an 18% by weight aqueous solution of sodium hydroxide for 1 hour, squeezed to 2.8 times, crushed for 1 hour while elevating the temperature from 25° C. to 50° C., and aged. Then, 175 g of carbon disulfide (35% by weight based on the cellulose) was added, and the mixture was subjected to sulfuration at 25° C. for 1 hour to form cellulose xanthate. The cellulose xanthate was dissolved in an aqueous solution of sodium hydroxide, and 500 g of flakes of polyethylene glycol (molecular weight 20,000) were added and dissolved to prepare an alkaline aqueous polymeric solution of cellulose xanthate and polyethylene glycol. The resulting alkaline aqueous polymeric solution had a cellulose concentration of 9.1%, a sodium hydroxide concentration of 5.4% by weight, a polyethylene glycol concentration of 8.3% by weight and a viscosity of 7,600 centipoises.

The resulting alkaline aqueous polymeric solution (60 g), 240 g of an aqueous solution of poly(sodium acrylate) as the second anionic polymeric compound (polymer concentration 12% by weight, molecular weight 50,000; Julymer AC-10N, a tradename for a product of Japan Pure Chemicals Co., Ltd.) and 2 g of calcium carbonate as a dispersant were put in a 500 ml flask and the total amount was adjusted to 300 g.

At a solution temperature of 30° C., the solution was stirred by a labostirrer (Model LR-51B made by Yamato Science Co., Ltd., rotating vane 7 cm) at a rotating speed of 600 rpm for 10 minutes to form fine particles of the alkaline polymeric aqueous solution. With continued stirring, the temperature of the liquid was raised from 30° C. to 70° C. over 15 minutes, and then the entire mixture was maintained at 70° C. for 30 minutes to coagulate the fine particles containing polyethylene glycol. With continued stirring, the fine particles were neutralized and regenerated with 100 g/liter of sulfuric acid to obtain a dispersion of fine cellulose particles. The dispersion was passed through a glass filter (type 25G4) to separate the fine cellulose particles containing polyethylene glycol from the mother liquor. The fine cellulose particles were washed with a large excess of water to remove polyethylene glycol from the fine particles to obtain porous fine cellulose particles.

The resulting fine cellulose particles (50 g as dry weight) and 300 g of an aqueous solution of sodium hydroxide in a sodium hydroxide solution of 7% by weight were put in a 1-liter flask and with stirring, fully swollen. The swollen cellulose particles were reacted with 150 g of a 50% by weight aqueous solution of 2-chlorotriethylamine hydrochloride at 70° C. for 60 minutes. Then, by a glass filter (type 25G4), the reacted particles were separated from the mother liquor, and washed with water. The properties of the resulting ion-exchanged cellulose particles are shown in Table 1.

TABLE 1

| Run No. | 1 |
|---|---|
| Average particle diameter ($\mu$m) | 72 |
| Crystallinity (%) | 23 |
| Ion-exchange capacity (meq/g) | 1.4 |
| Total volume of pores having a pore diameter in the range of 0.006–1 $\mu$m (ml/g) | 0.51 |
| Pore diameter which showed the maximum value of the pore volume ($\mu$m) | 0.30 |

EXAMPLE 2

Cellulose xanthate obtained in the same way as in Example 1 was dissolved in an aqueous solution of sodium hydroxide, and then polyethylene glycol (molecular weight 4,000) was added in an amount of 250 g, 500 g and 1,000 g, respectively to give porous fine cellulose particles. Then, under the same conditions as in Example 1, the porous fine cellulose particles were reacted with 2-chlorotriethylamine hydrochloride to give ion-exchanged fine cellulose particles. The properties of the resulting product are shown in Table 2.

TABLE 2

| Run No. | 2 | 3 | 4 |
|---|---|---|---|
| Average particle diameter ($\mu$m) | 70 | 68 | 65 |
| Ion-exchange capacity (meq/g) | 1.1 | 1.1 | 1.3 |
| Crystallinity (%) | 29 | 27 | 25 |
| Total volume of pores having a pore diameter in the range of 0.006–1 $\mu$m (ml/g) | 0.12 | 0.10 | 0.10 |
| Pore diameter which showed the maximum value of the pore volume ($\mu$m) | 0.008 | 0.020 | 0.035 |

EXAMPLE 3

Cellulose xanthate obtained in the same way as in Example 1 were dissolved in an aqueous solution of sodium hydroxide in the same way as in Example 1, and then 500 g of polyethylene glycol (molecular weight 6,000) was added and dissolved to prepare an alkaline aqueous solution of cellulose xanthate and polyethylene glycol having a cellulose concentration of 8.8% by weight, a sodium hydroxide concentration of 5.5% by weight, a polyethylene glycol concentration of 4.5% by weight and a viscosity of 6,800 centipoises.

The resulting alkaline aqueous solution (60 g), 240 g of an aqueous solution of polyethylene glycol as the second polymeric compound (molecular weight 20,000, polymer concentration 30% by weight) and 2 g of calcium carbonate were put in a 500 ml flask, and the total amount was adjusted to 300 g. At a liquid temperature of 40° C., the mixture was stirred at 400 rpm for 10 minutes by a labostirrer. With continued stirring, the liquid temperature was raised from 40° C. to 70° C. over 15 minutes to form fine particles of the alkaline aqueous polymer solution. The fine particles were maintained at 70° C. for 30 minutes to coagulate the fine particles containing polyethylene glycol (molecular weight 6,000). The coagulated particles were reacted as in Example 1 to give porous fine ion-exchanged cellulose particles.

TABLE 3

| Run No. | 5 |
|---|---|
| Average particle diameter ($\mu$m) | 70 |
| Crystallinity (%) | 20 |
| Ion-exchange capacity (meq/g) | 1.3 |
| Total volume of pores having a pore diameter in the range of 0.006–1 $\mu$m (ml/g) | 0.30 |
| Pore diameter which showed the maximum value of the pore volume ($\mu$m) | 0.16 |

EXAMPLE 4

Fine cellulose particles (50 g as dry weight) obtained by the same method as in Example 3 and 300 g of an aqueous solution of sodium hydroxide with a sodium hydroxide concentration of 8% by weight were put in a 1-liter flask, and with stirring, the cellulose particles were sufficiently swollen. Then, 100 g of a 50% by weight aqueous solution of monochloroacetic acid was added, and reacted with the cellulose particles at 70° C. for 40 minutes. Then, the particles were separated from the mother liquor by a glass filter (type 25G4), and washed with water. The properties of the resulting ion-exchanged cellulose particles are shown in Table 4.

TABLE 4

| Run No. | 6 |
|---|---|
| Average particle diameter ($\mu$m) | 70 |
| Crystallinity (%) | 28 |
| Ion-exchange capacity (meq/g) | 1.1 |
| Total volume of pores having a pore diameter in the range of 0.006–1 $\mu$m (ml/g) | 0.32 |
| Pore diameter which showed the maximum value of the pore volume ($\mu$m) | 0.012 |

EXAMPLE 5

Fine cellulose particles (50 g as dry weight) obtained by the same method as in Example 3 and 600 of an aqueous solution of sodium hydroxide having a sodium hydroxide concentration of 7% by weight, and sufficiently swollen with stirring under ice cooling. Then, 300 ml of a 30% by weight ethyl ether solution of phosphoryl chloride was added slowly under ice cooling, and reacted with the fine cellulose particles at 20° C. for 60 minutes. The reacted particles were then separated from the mother liquor by a glass filter (type 25G4), and washed with water. The properties of the ion-exchanged cellulose particles are shown in Table 5.

TABLE 5

| Run No. | 7 |
|---|---|
| Average particle diameter ($\mu$m) | 72 |
| Crystallinity (%) | 33 |
| Ion-exchange capacity (meq/g) | 0.8 |
| Total volume of pores having a pore diameter in the range of 0.006–1 $\mu$m (ml/g) | 0.18 |
| Pore diameter which showed the maximum value of the pore volume ($\mu$m) | 0.009 |

EXAMPLE 6

Fine cellulose particles (60 g as dry weight) obtained in Example 1 were stirred in 1 liter of a 5% by weight aqueous solution of sodium hydroxide containing 20% by weight of epichlorohydrin to crosslink the fine cellulose particles at 60° C. for 3 hours. Subsequently, the fine cellulose particles were separated from the mother liquor by a glass filter, and neutralized with 5% by weight hydrochloric acid to give crosslinked fine cellulose particles. The particles were washed with a large excess of water, and separated (50 g as dry weight) by filtration. The ion-exchange groups were introduced into the fine cellulose particles by the same method as in Example 1. The properties of the resulting ion-exchanged cellulose particles are shown in Table 6.

TABLE 6

| Run No. | 8 |
|---|---|
| Average particle diameter ($\mu$m) | 80 |
| Crystallinity (%) | 29 |
| Ion-exchange capacity (meq/g) | 0.8 |
| Total volume of pores having a pore diameter in the range of 0.006–1 $\mu$m (ml/g) | 0.25 |
| Pore diameter which showed the maximum value of the pore volume ($\mu$m) | 0.31 |

EXAMPLE 7

The exclusion limit molecular weights and fractionation indices (F values) of the ion-exchanged cellulose particles obtained in Run No. 1 in Example 1 and Runs Nos. 2 and 3 in Example 2 were measured, and the results are shown in Table 7.

The results of measurement of the amount of BSA adsorbed are also shown.

TABLE 7

| Run No. | 1 | 2 | 4 |
|---|---|---|---|
| Exclusion limit molecular weight | 8,000 | 7,000 | 13,000 |
| Fractionation index (F value) | 1.38 | 0.96 | 0.84 |
| Amount of BSA adsorbed (mg/ml) | 21.3 | 12.0 | 104.9 |

EXAMPLE 8

The ion-exchanged cellulose particles obtained in Run No. 4 in Example 2 were immersed in a buffer (0.05M Tris-HCl, pH 8.35) and then filled in a resin column having a diameter of 9 mm and a length of 15 cm at a flow rate of 4.0 ml/min. over 30 minutes. The amount of a buffer which eluted by spontaneous falling from a height of 28.5 cm from a reservoir was plotted against the time, and the flow rate per unit height was calculated and found to be 0.24 ml/min. This led to the determination that when the above ion-exchanged cellulose particles are filled in a column, and ion-exchange chromatography is carried out, the cellulose particles have excellent flowing liquid property and pressure resistance.

EXAMPLE 9

Pulp (500 g) from a conifer was steeped in 20 liters of an 18% by weight aqueous solution of sodium hydroxide for 1 hour, sqeezed to 2.8 times, crushed for 1 hour while elevating the liquid temperature from 25° C. to 50° C., and aged. Then, 165 g (33% by weight based on cellulose) of carbon disulfide was added to sulfurate the cellulose at 25° C. for 1 hour and to form cellulose xanthate. The cellulose xanthate was dissolved in an aqueous solution of sodium hydroxide to form a viscose having a cellulose concentration of 9.3% by weight, a sodium hydroxide concentration of 5.9% by weight and a viscosity of 6,200 centipoises.

The resulting viscose (120 g) and 480 g of an aqueous solution of poly(sodium acrylate) (polymer concentration 12% by weight, molecular weight 50,000) as the anionic polymeric compound were put in a 1-liter flask, and the total amount was adjusted to 600 g. At a liquid temperature of 30° C., the mixture was stirred at 600 rpm for 10 minutes by a labostirrer (Model LR-51B made by Yamato Science Co., Ltd.; rotating vane 7 cm) to form fine particles of the viscose. With continued stirring, the liquid temperature was elevated from 30° C. to 70° C. over 15 minutes, and the fine viscose particles were maintained at 70° C. for 10 minutes to coagulate the fine viscose particles. The coagulated viscose particles were separated from the mother liquor by a glass filter (type 25G4). The resulting coagulated viscose particles had a particle diameter of 80 micrometers and contained 45% by weight (as cellulose) of a cellulose component.

The coagulated viscose particles were washed with a 0.5% by weight of an aqueous solution of sodium hydroxide, and 60 g of them were separated by filtration on a glass filter (type 25G4), and then crosslinked at 60° C. for 3 hours with stirring in 1 liter of an 8% by weight aqueous solution of sodium hydroxide containing 20% by weight of epichlorohydrin. Subsequently, the crosslinked cellulose particles were separated from the mother liquor, neutralized with 5% by weight hydrochloric acid to form crosslinked fine cellulose particles which were then washed with a large excess of water.

The resulting crosslinked fine cellulose particles (50 g as dry weight) and 300 g of an aqueous solution of sodium hydroxide solution were put in a 1-liter flask, and with stirring, fully swollen. The crosslinked cellulose particles were then reacted with 150 g of a 50% by weight aqueous solution of 2-chlorotriethylamine hydrochloride at 70° C. for 60 minutes. The reacted particles were then separated from the mother liquor by a glass filter (type 25G4), and washed with water.

The properties of the resulting ion-exchanged cellulose particles obtained are shown in Table 1, Run No. 9.

EXAMPLE 10

Ion-exchanged cellulose particles were prepared in the same way as in Example 9 except that the concentration of epichlorohydrin was changed to 5, 15 and 25% by weight, respectively. The properties of the resulting ion-exchanged cellulose particles are shown in Table 8, Run No. 10, Run No. 11 and Run No. 12, respectively.

EXAMPLE 11

Ion-exchanged cellulose particles were prepared as in Example 9 except that the concentration of the 2-chlorotriethylamine hydrochloride was changed to 10, 30 and 70% by weight, respectively. The properties of the resulting cellulose particles are shown in Table 1, Run No. 13, Run No. 14 and Run No. 15.

TABLE 8

| | Examples | | | | | | |
|---|---|---|---|---|---|---|---|
| | 9 | 10 | | | 11 | | |
| Run No. | 9 | 10 | 11 | 12 | 13 | 14 | 15 |
| Average particle diameter ($\mu$m) | 72 | 82 | 85 | 70 | 76 | 75 | 75 |
| Crystallinity (%) | 35 | 38 | 34 | 29 | 48 | 42 | 29 |
| Ion-exchange capacity (meq/g) | 1.6 | 1.6 | 1.6 | 1.4 | 0.3 | 0.6 | 1.9 |
| Pore diameter which showed the maximum value of the pore volume ($\mu$m) | 0.025 | 0.030 | 0.030 | 0.025 | 0.055 | 0.040 | 0.025 |
| Pore Volume of pores having a pore diameter in the range of 0.06–1 $\mu$m (ml/g) | 0.53 | 0.36 | 0.44 | 0.35 | 0.83 | 0.64 | 0.33 |

EXAMPLE 12

Crosslinked fine cellulose particles (50 g as dry weight) obtained in the same way as in Example 9 and 300 g of an aqueous solution of sodium hydroxide in a sodium hydroxide concentration of 7% by weight were put in a 1-liter flask, and with stirring, the cellulose particles were fully swollen. Then, 100 g of a 50% by weight aqueous solution of monochloroacetic acid was added, and reacted with the cellulose acetate particles at 70° C. for 40 minutes. The reacted particles were then separated from the mother liquor by a glass filter (type 25G4), and washed with water. The properties of the resulting ion-exchanged cellulose particles are shown in Table 9, Run No. 16.

EXAMPLE 13

Crosslinked fine cellulose particles (50 g as dry weight) obtained in the same way as in Example 9 and 600 of an aqueous solution of sodium hydroxide having a sodium hydroxide concentration of 7% by weight were put in a flask, and with stirring under ice water, the cellulose particles were sufficiently swollen. Then, 300 ml of a 30% by weight ethyl ether solution of phosphoryl chloride was slowly added and reacted with the crosslinked cellulose particles at 20° C. for 60 minutes. The reacted particles were then separated from the mother liquor by a glass filter (type 25G4), and washed with water. The properties of the ion-exchanged cellulose particles so obtained are shown in Table 9, Run No. 17.

EXAMPLE 14

Ion-exchanged cellulose particles obtained in the same way as in Example 9 were heat-treated for 5 hours in an air circulating dryer at 105° C. The properties of the resulting heat-treated particles are shown in Table 2, Run No. 18.

EXAMPLE 15

Ion-exchanged cellulose particles obtained in the same way as in Example 9 were washed with a 0.5% by weight aqueous solution of sodium hydroxide, and 60 g of the cellulose particles were separated by filtration on a filter (type 25G4) and crosslinked at 60° C. for 3 hours in 1 liter of a mixed solvent of acetone and DMSO (1:1) containing 8% by weight of epichlorohydrin. Subsequently, the crosslinked cellulose particles were separated from the mother liquor by a glass filter, neutralized with 5% by weight hydrochloric acid, and washed with a large excess of water.

The properties of the resulting ion-exchanged cellulose particles are shown in Table 9, Run No. 19.

EXAMPLE 16

Crosslinked particles obtained in the same way as in Example 9 were heat-treated for 5 hours in an air circulating dryer at 105° C., and then 50 g (dry weight) of the heat-treated particles were separated by filtration, and ion-exchange groups were introduced into these particles in the same way as in Example 9. The properties of the resulting ion-exchanged crosslinked cellulose particles are shown in Table 9, Run No. 20.

TABLE 9

| | Examples | | | | |
|---|---|---|---|---|---|
| | 12 | 13 | 14 | 15 | 16 |
| Run No. | 16 | 17 | 18 | 19 | 20 |
| Average particle diameter (μm) | 86 | 84 | 68 | 74 | 68 |
| Crystallinity (%) | 46 | 43 | 36 | 25 | 36 |
| Ion-exchange capacity (meq/g) | 0.9 | 0.6 | 1.6 | 1.2 | 1.6 |
| Pore diameter which showed the maximum value of the pore volume (μm) | 0.10 | 0.10 | 0.025 | 0.035 | 0.020 |
| Pore volume of pores having a pore diameter in the range of 0.06–1 μm (ml/g) | 1.11 | 1.19 | 0.41 | 0.53 | 0.29 |

EXAMPLE 17

The exclusion limit molecular weights and fractionation indices (F values) of the porous crosslinked ion-exchanged fine cellulose particles obtained in Runs Nos. 9, 10, 16, 17, 19 and 20 were measured, and the results are shown in Table 10. The results of measurement of the amount of BSA or hemoglobin adsorbed are also shown in Table 10.

TABLE 10

| Run No. | 9 | 10 | 16 | 17 | 19 | 20 |
|---|---|---|---|---|---|---|
| Exclusion limit molecular weight | 5,000 | 5,800 | 10,000 | 10,000 | 6,500 | 1,500 |
| Fractionation index (F value) | 1.52 | 1.60 | 1.92 | 0.94 | 1.60 | 1.33 |
| Amount of BSA adsorbed (mg/ml) | 173 | 196 | | | 96 | 32 |
| Amount of hemoglobin adsorbed (mg/ml) | | | 155 | 133 | | |

EXAMPLE 18

The porous fine crosslinked ion-exchanged cellulose particles obtained in Runs Nos. 10, 11, 12, 18, 19 and 20 were individually filled in resin columns having an inside diameter of 1.6 cm and a length of 15 cm using water as a filling liquid under a constant pressure of about 0.5 kg/cm² by means of a peristaltic pump. The relation between the flow rate and the pressure drop is shown in FIG. 1.

EXAMPLE 19

Pulp (500 g) from a conifer was steeped for 1 hour in 20 liters of an 18% by weight aqueous solution of sodium chloride at 20° C., squeezed to 2.8 times, crushed for 1 hour while elevating the temperature from 25° C. to 50° C., and aged. Then, 175 g (35% by weight based on the cellulose) of carbon disulfide was added to sulfurate the cellulose at 25° C. and to form cellulose xanthate. The cellulose xanthate was dissolved in an aqueous solution of sodium hydroxide, and 250 g of flakes of polyethylene glycol (molecular weight 4,000) were added and dissolved to prepare an alkaline aqueous solution of cellulose xanthate and polyethylene glycol. The alkaline aqueous solution had a cellulose concentration of 9.1% by weight, a sodium hydroxide concentration of 5.4% by weight, a polyethylene glycol concentration of 4.6% by weight and a viscosity of 76,000 centipoises.

Sixty grams of the alkaline aqueous polymeric solution prepared above, 240 g of an aqueous solution of poly(sodium acrylate) as the second anionic polymeric compound (polymer concentration 12% by weight, molecular weight 50,000; Julymer AC-10N, a tradename for a product of Japan Pure Chemicals Co., Ltd.) and 2 g of calcium carbonate as a dispersant were put in a 500 ml flask, and the total amount was adjusted to 300 g.

At a liquid temperature of 30° C., the mixture was stirred for 10 minutes at 600 rpm by means of a labostirrer (Model LR-51B made by Yamato Science Co., Ltd.; rotating vane 7 cm) to prepare fine particles of the alkaline polymeric solution. Subsequently with stirring, the temperature of the liquid was elevated from 30° C. to 70° C. over 15 minutes. The mixture was maintained at 70° C. for 30 minutes to coagulate the fine particles containing polyethylene glycol. Further, with stirring, the fine particles were neutralized and regenerated with 100 g/liter of sulfuric acid to give a dispersion of fine cellulose particles. The dispersion was passed through a glass filter (type 1G4), and the cellulose particles containing polyethylene glycol were separated from the mother liquor, and washed with a large excess of water to remove the polyethylene glycol from the fine particles and give porous fine cellulose particles.

The properties of the resulting porous particles were as follows:

Average particle diameter: 72 micrometers
Pore size distribution: 50 to 3,000 angstrom
Total volume of pore sizes: 1.41 ml/g
Total area of pore sizes: 117 m$^2$/g
Maximum value of the differential curve in the above region: 1200 angstrom
Amount of active groups introduced: 260 mg/g

EXAMPLE 20

The porous fine cellulose particles obtained in Example 19 were filled in a stainless column having an inside diameter of 4 mm and a length of 15 cm in accordance with the standard method of measuring the pressure resistance of wet particles described above, and the relation between the flow rate and the pressure drop was measured in the case of passing water through the column.

Figure 2:
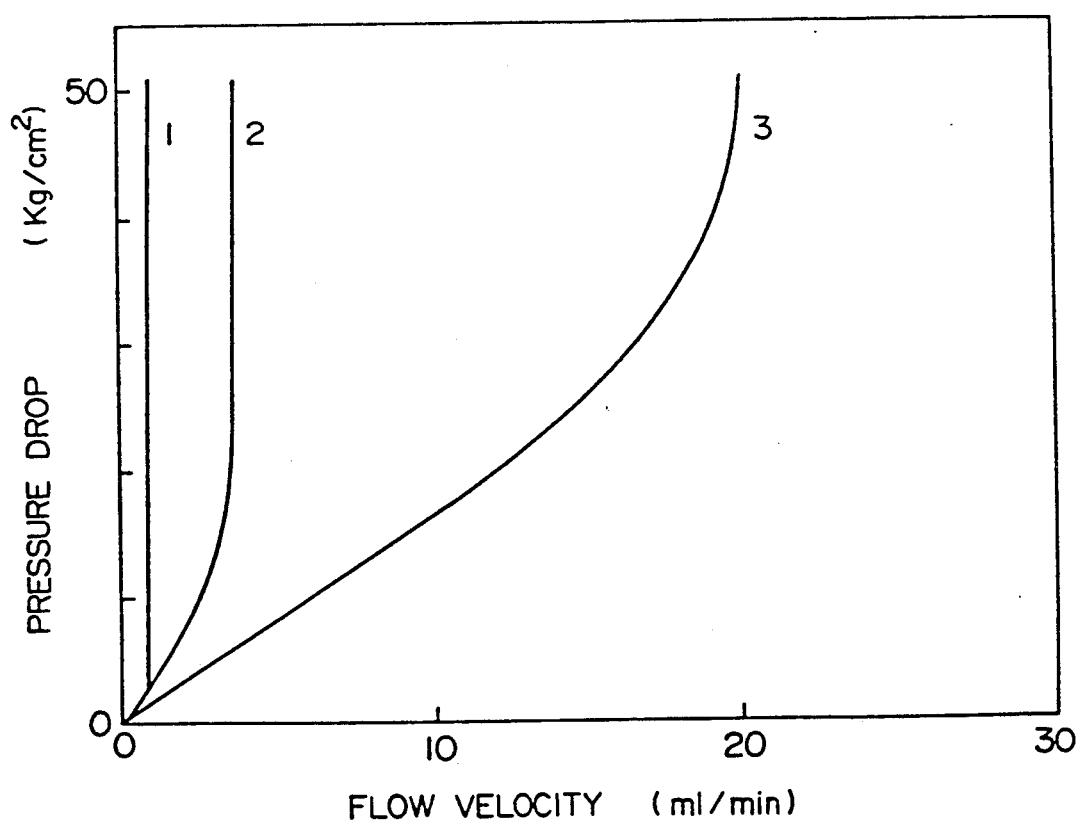
FIG. 2 shows the relation between the flow velocity and the pressure drop in the porous fine cellulose particles of the invention.

For comparison, the same measurement was performed on a commercial agarose-type filler. The results are shown in FIG. 2. The porous fine cellulose particles of the invention have excellent wet pressure resistance and can withstand use at a high flow rate or with an increased pressure drop owing to scaling up. In FIG. 2, curves 1 and 2 relate to a known crosslinked agarose-type filler and a known highly crosslinked agarose-type filler, and curve 3, to the fine cellulose particles of the invention.

EXAMPLES 21-26

Porous cellulose particles were prepared in the same way as in Example 19 except that the molecular weight and amount of polyethylene glycol (PEG) were changed as shown in Table 11. The pore volumes of these particles had a maximum value between a pore particle diameter of 0.08 micrometer and a pore particle diameter of 0.2 micrometer. The total volumes of the particles within a particle diameter range of 0.06 to 1 micrometer was 1.1 to 1.8 ml/g.

Ligands were introduced into the resulting particles by the following method.

A stirrer and a glass calomel electrode for pH measurement were provided in a 100 ml reactor. To various porous gel suspensions (4 ml) were added 27 ml of distilled water and 24 ml of 2.5% BrCN. The reaction solution was reacted at 20° C. for 6 minutes while maintaining the solution at a pH of 10.5 to 11 with 1N sodium hydroxide. The reaction mixture was transferred to a glass filter, washed with 30 ml of 0.1M-NaHCO$_3$ solution at 4° C. and then with 0.12M borax buffer (pH 8.0) at 4° C. to give activated cellulose particles. Then, the activated particles (apparent volume 0.4 ml) were added to 2 ml of 0.1M borax buffer containing 50 ml of bovine serum albumin (BSA), and they were mixed at 4° C. for 20 hours with stirring. After the reaction, the reaction mixture was washed with 50mM phosphate buffer (pH 6.8). The amount of BSA introduced into the porous particles was determined by the amount of BSA in the supernatant of the reaction mixture and the amount of BSA in the washing through measurement of the absorbance of ABS$_{280}$. The wet pressure resistance was measured as in Example 20.

The wet pressure resistances and the amounts of BSA introduced of these particles are shown in Table 11.

TABLE 11

| Example | PEG added Molecular weight | PEG added Amount (%) | Wet pressure resistance (kg/cm$^2$) | Amount of BSA introduced (mg/g-carrier) |
|---|---|---|---|---|
| 21 | 4,000 | 15 | 83 | 70 |
| 22 | 4,000 | 50 | 46 | 253 |
| 23 | 4,000 | 100 | 19 | 330 |
| 24 | 6,000 | 45 | 50 | 230 |
| 25 | 20,000 | 25 | 65 | 77 |
| 26 | 20,000 | 50 | 43 | 89 |

1): The amount of PEG added was expressed in % by weight based on cellulose.

2): The amount of BSA introduced was the amount of protein introduced based on the weight of the dry carrier.

EXAMPLE 27

Figure 3:
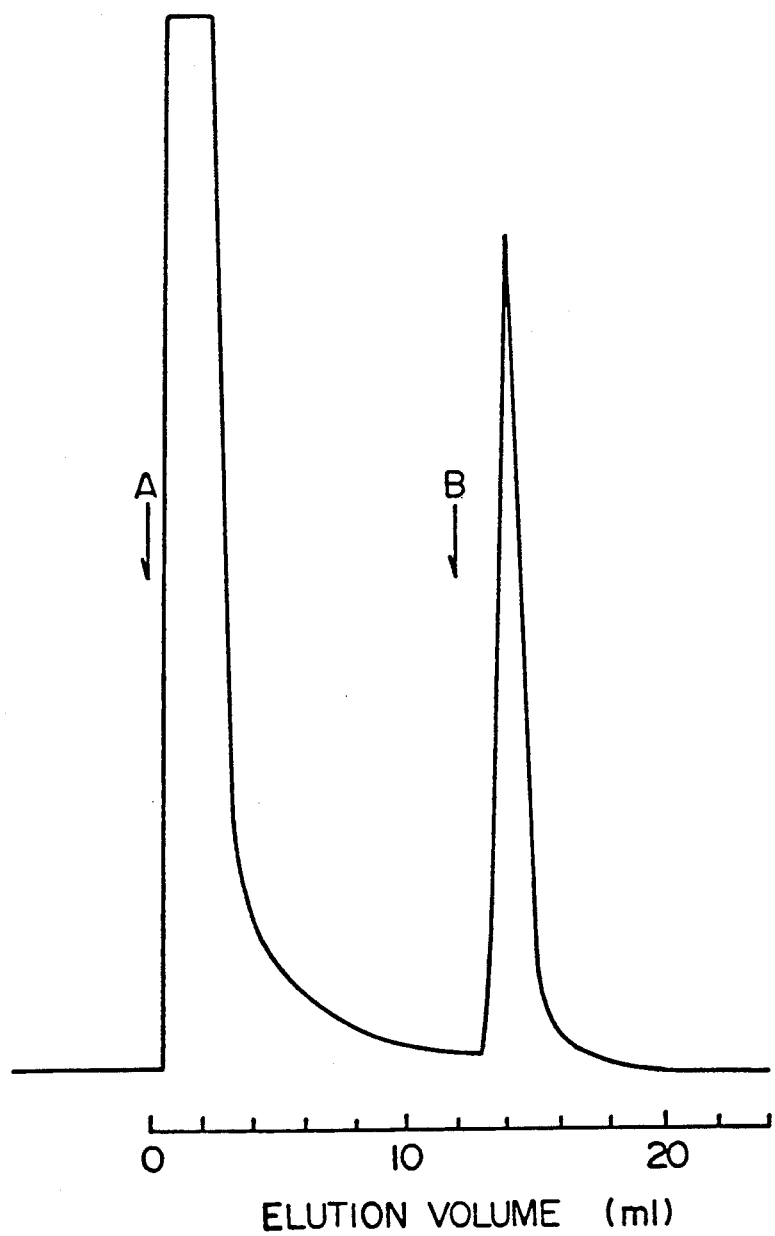
FIG. 3 is an example of affinity chromatogram using the porous fine cellulose particles of the invention as an affinity carrier.

The filler suspension (4 ml) of Example 18 was activated by the method of Example 21, and protein A derived from yellow Staphylococus bacterium was introduced. The amount of protein A used for coupling was 10 mg. The protein A-introduced gel so prepared held 30 mg of protein A per gram of dry weight. The protein A-introduced gel was filled in a stainless steel column having an inside diameter of 4 mm and a length of 75 mm at a flow rate of 10 ml/min. for 1 hour to prepare an affinity column. One milliliter of the mouse ascites from which cell fragments were removed by centrifugation was introduced into the affinity column to separate and purify IgG. There was obtained 9.8 g of IgG. The chromatogram was shown in FIG. 3. The separating conditions in this case were as follows:

Separating conditions

A: binding buffer = 3M NaCl, 0.1M glycine (pH 8.9)
B: eluting buffer = 0.1M citrate (pH 3.0)
Flow velocity: 1.6 ml/cm$^2$-min.

The binding buffer was passed for one hour, and then, the eluting buffer was passed for one hour.
Detection: ABS$_{280}$
Temperature: 4° C.

EXAMPLE 28

The filler (4 ml) of Example 19 was activated by the method of Example 21, and an anti-APP monoclonal antibody was introduced into the filler. The amount of the anti-APP antibody used in coupling was 4 mg. The APP antibody-introduced gel so prepared held 6 mg of the anti-APP monoclonal antibody per dry weight. The APP antibody-introduced gel was filled in a stainless steel column having an inside diameter of 4 mm and a length of 75 mm at a flow rate of 10 ml/min. for 1 hour to prepare an affinity column. APP (200 ng) was diluted with 200 microliters of human serum and introduced into the column, and APP was recovered. The amount of APP recovered was determined by the sandwich method by using a peroxidase-labelled anti-APP antibody. The amount of APP recovered was 162 ng, and the ratio of recovery was 81%. The separating conditions were as follows:

Separating conditions

Binding buffer: 0.1M PBS, pH 7.2
Eluting buffer: 0.1M glycine HCl buffer, pH 2.5
Temperature: 37° C.

The binding buffer was passed for 3 hours at a rate of 0.5 ml/hr, and then the eluting buffer was passed for 3 hours at a rate of 1 ml/hr.
Detection: $ABS_{280}$

EXAMPLE 29

The fine cellulose particles (60 g as dry weight) obtained in Example 19 were crosslinked at 60° C. for 3 hours with stirring in 1 liter of an 8% by weight of aqueous solution of sodium hydroxide containing 20% by weight of epichlorohydrin. Subsequently, the crosslinked cellulose particles were separated from the mother liquor by a glass filter and neutralized with 5% by weight hydrochloric acid to give crosslinked fine cellulose particles. The properties of the crosslinked particles were as follows:
Average particle diameter: 80 micrometers
Crystallinity: 29%
Pore diameter showing a maximum pore volume: 0.31 micrometer
Amount of active groups introduced: 300 mg/g

EXAMPLE 30

Four milliliters of the suspension containing the filler having an apparent volume of 2 ml obtained in Example 21 was activated by the method of Example 21, and 10 mg of horseradish peroxidase (RZ=3, Sigma Co., Ltd.) was introduced into the suspension. The peroxidase-introduced gel prepared as above held 29 mg of horseradish peroxidase per g of dry weight. In a jacketed 20 ml reactor, the peroxidase-introduced gel was suspended in 4 ml of 0.1M phosphate buffer (pH 7.2), and the inside temperature of the reactor was kept at 10° C. Anti-serum (5.0 ml) obtained by inoculating horseradish peroxidase (RZ=3, Sigma Co., Ltd.) in rabbit was added to the suspension and mixed with stirring for 3 hours. The gel suspension was separated by filtration on a glass filter, and washed five times with 10 ml of 0.01M phosphate buffer (pH 7.2). The washed gel was returned to the reactor, and mixed with 4 ml of 0.1M glycine buffer (pH 2.5) with stirring for 1 hour. The mixture was filtered by a glass filter. The filtrate was recovered and 6 mg of an anti-peroxidase antibody was obtained.

We claim:

1. Ion-exchanged fine cellulose particles, comprising
   (a) spherical or long spherical particles having a particle diameter of not more than 500 micrometers when wet,
   (b) composed of a crystalline cellulose phase and an amorphous cellulose phase,
   (c) having an ion-exchange capacity of 0.1 to 3 meq/g, and
   (d) in a relation between pore diameter and pore volume of particles subjected to critical drying which is measured by a mercury porosimeter method, they have a maximum pore volume value within a pore diameter range of 0.006 to 1 micrometer, and the total volume of pores within the above range is at least 0.05 ml/g.

2. The cellulose particles of claim 1 in which no substantial crosslinkage exists between cellulose molecular chains in the amorphous cellulose phase.

3. The cellulose particles of claim 1 in which crosslinkage exists between cellulose molecular chains in the amorphous cellulose phase.

4. The cellulose particles of claim 1 which have a particle diameter in the wet state of 3 to 400 micrometers.

5. The cellulose particles of claim 1 which have a particle diameter in the wet state of 10 to 300 micrometers.

6. The cellulose particles of claim 1 which have an ion exchange capacity of 0.3 to 2.5 meq/g.

7. The cellulose particles of claim 1 which have an ion exchange capacity of 0.5 to 2.0 meq/g.

8. The cellulose particles of claim 1 in which the total volume of pores having a pore diameter in the range of 0.006 to 1 micrometer is in the range of 0.1 to 3 ml/g.

9. The cellulose particles of claim 1 in which the total volume of pores having a pore diameter in the range of 0.006 to 1 micrometer is in the range of 0.12 to 1.5 ml/g.

10. The cellulose particles of claim 1 in which the area of the inside surface of the pores, calculated from the relation between the pore diameter and the pore volume is 15 to 400 $m^2/g$.

11. The cellulose particles of claim 1 in which the area of the inside surface of the pores, calculated from the relation between the pore diameter and the pore volume is 25 to 350 $m^2/g$.

12. The cellulose particles of claim 1 in which the ion-exchange group is a cation exchange group.

13. The cellulose particles of claim 12 in which the cation exchange group is represented by the following formula

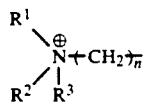

wherein $R^1$, $R^2$ and $R^3$, independently from each other, represent a hydrogen atom, an alkyl group having 1 or 2 carbon atoms, or a hydroxyalkyl group having 1 to 3 carbon atoms, and n is a number of 1 to 3.

14. The cellulose particles of claim 1 in which the ion-exchange group is an anion exchange group.

15. The cellulose particles of claim 14 in which the anion exchange group is represented by the following formula

wherein Z represents a carboxyl group (—COOH), a sulfo group (—$SO_3H$) or a phosphoryl group (—$PO_3H_2$, and m is 0 or a number of 1 to 3.

16. The cellulose particles of claim 1 which consists of a II-type crystalline cellulose phase and an amorphous cellulose phase.

17. The cellulose particles of claim 16 which have an exclusion limit molecular weight higher than 500 but lower than 1,000,000.

18. The cellulose particles of claim 1 which have a crystallinity, determined by X-ray diffractometry, of 5 to 45%.

19. The cellulose particles of claim 18 of which crystallinity is 10 to 43%.

20. The cellulose particles of claim 18 of which stallinity is 20 to 40%.

21. The cellulose particles of claim 1 which have an exclusion limit molecular weight higher than 1,000 but lower than 500,000.

22. The cellulose particles of claim 1 which have a fractionation index (F), defined by the following formula $$F = \frac{V_E - V_D}{V_D}$$

wherein $V_D$ represents the elution volume (ml) of blue dextran (molecular weight 2,000,000), and $V_E$ is the elution volume (ml) of ethylene glycol, of at least 1.0.

23. The cellulose particles of claim 1 of which fractionation index (F) is at least 1.0.

24. The cellulose particles of claim 1 of which fractionation index (F) is at most 3.

25. A method of producing the porous ion-exchanged cellulose particles of claim 1, which comprises
  (1) preparing fine coagulated viscose particles containing 5 to 60% by weight, calculated as cellulose, of cellulose xanthate,
  (2) regenerating cellulose by (2-1) directly neutralizing the fine coagulated viscose particles with an acid, or (2-2) subjecting the fine coagulated viscose particles to a crosslinking reaction and then neutralizing the reaction product with an acid, or (2-3) neutralizing the fine coagulated viscose particles with an acid and subjecting the neutralization product to a crosslinking reaction,
  (3) forming spherical or long spherical particles having a particle diameter of not more than 500 micrometers when wet, composed of a crystalline cellulose phase and an amorphous cellulose phase, and in a relation between pore diameter and pore volume of particles subjected to critical drying which is measured by a mercury porosimeter method, they have a maximum pore volume value with a pore diameter range of 0.006 to 1 micrometer, and the total volume of pores within the above range is at least 0.05 ml/g, and
  (4) introducing ion-exchange groups into the resulting fine cellulose particles in a uniform alkaline solvent.

26. The method of claim 25 in which the fine coagulated viscose particles prepared in step (1) have an average particle diameter of not more than 400 micrometers.

27. The method of claim 25 in which in step (2), step (2-2) or (2-3) is performed.

28. The method of claim 25 in which the crosslinking reaction in step (2-2) or (2-3) is carried out in a liquid medium containing 1 to 15% by weight of an alkali hydroxide.

29. The method of claim 28 in which the alkali hydroxide is sodium hydroxide or potassium hydroxide.

30. The method of claim 28 in which the liquid medium is water, or an aqueous medium composed of water and an organic solvent which is miscible with water and is a good solvent for the crosslinking agent.

31. The method of claim 25 which step (2-2) or (2-3) is carried out in step (2), then step (3) is carried out, and further as step (4), the fine particles formed in step (3) are again subjected to a crosslinking reaction in an organic medium, or to heat-treatment.

32. The method of claim 25 in which step (2-2) or (2-3) is carried out in step (2), and the resulting fine cellulose particles are heat-treated before they are subjected to step (3).

* * * * *